United States Patent
Kotnis et al.

(12) 
(10) Patent No.: US 6,355,196 B1
(45) Date of Patent: *Mar. 12, 2002

(54) PROCESS FOR PRODUCING DIRECT TOOLING MOLD AND METHOD FOR USING THE SAME

(75) Inventors: Mahesh Arvind Kotnis, Okemos; Brian H. Kukulies, Dorr; Kenneth R. Filipiak, West Olive; David D. Schwarting, Holland, all of MI (US)

(73) Assignee: Vantico Inc., Brewster, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,765

(22) Filed: Mar. 16, 1998

(51) Int. Cl.⁷ .............................................. B29C 33/40
(52) U.S. Cl. ............... 264/219; 264/328.1; 264/331.13; 264/331.19; 264/337; 249/134
(58) Field of Search ............................... 264/219, 328.1, 264/337, 331.13; 249/134, 331.19

(56) References Cited

U.S. PATENT DOCUMENTS

| | | | | |
|---|---|---|---|---|
| 3,725,105 A | * | 4/1973 | Chase | 117/2 R |
| 3,741,928 A | * | 6/1973 | Salensky | 260/37 |
| 3,751,200 A | * | 8/1973 | Borisuck et al. | 425/119 |
| 3,827,667 A | | 8/1974 | Jemelseen | 249/80 |
| 3,861,936 A | | 1/1975 | Winter | 117/8 |
| 4,528,305 A | * | 7/1985 | Henry | 523/219 |
| 4,737,211 A | | 4/1988 | Hutchinson et al. | 156/154 |
| 4,863,663 A | | 9/1989 | Nicee, Jr. et al. | 264/130 |
| 4,916,173 A | | 4/1990 | Otloski et al. | 523/219 |
| 5,231,749 A | | 8/1993 | Hutchison | 29/407 |
| 5,237,036 A | | 8/1993 | Spitzer | 528/67 |
| 5,280,053 A | * | 1/1994 | Dearlove et al. | 523/435 |
| 5,340,634 A | * | 8/1994 | Adams | 428/131 |
| 5,432,322 A | | 7/1995 | Ingram et al. | 219/528 |
| 5,439,622 A | | 8/1995 | Pennisi et al. | 264/22 |
| 5,458,825 A | * | 10/1995 | Grolman et al. | 264/401 |
| 5,543,103 A | * | 8/1996 | Hogan et al. | 264/219 |
| 5,552,992 A | * | 9/1996 | Hunter | 364/468.25 |
| 5,562,846 A | | 10/1996 | McKeen | 249/79 |
| 5,616,293 A | | 4/1997 | Ashtioni-Zarandiere | 264/401 |
| 5,641,448 A | * | 6/1997 | Yeung et al. | 264/401 |
| 5,691,402 A | | 11/1997 | Anders | 523/515 |
| 5,859,096 A | * | 1/1999 | Hoge et al. | 523/427 |
| 5,942,168 A | * | 8/1999 | Ichikawa et al. | 264/40.1 |
| 6,067,480 A | * | 5/2000 | Stuffle et al. | 700/109 |
| 6,103,456 A | * | 8/2000 | Holtzberg | 264/102 |

FOREIGN PATENT DOCUMENTS

| | | |
|---|---|---|
| EP | 0 170 374 | 2/1986 |
| EP | 0341210 | 11/1989 |
| WO | 9205216 | 4/1992 |
| WO | 97/18074 | 5/1997 |

OTHER PUBLICATIONS

Abst. Page for DE 4,322,684.
Abst. Page for DE 4,431,985 which is equivalent to DE 295 14 277.
Urethanes Technology 12/95 and 1/96 p. 41.
Plastics World—Machinable Stock Speeds Prototyping v.51 (11) p. 65.

(List continued on next page.)

*Primary Examiner*—Suzanne E. McDowell
(74) *Attorney, Agent, or Firm*—Lyon & Lyon LLP

(57) ABSTRACT

The present invention relates to a method for making a prototype by providing at least one polymeric board material having a glass transition temperature less than the molten temperature of a thermoplastic molding material and removing at least a portion of the polymeric board material to form, according to a computer-aided design, a reverse image of a desired article to be molded. Selected molten polymeric molding material is injected into the resulting mold to produce the desired prototype.

14 Claims, 2 Drawing Sheets

OTHER PUBLICATIONS

PU Epoxy Systems Modern Plastics Int. v. 26 (7)p. 100.
Injection Molding, "Rapid Prototyping Report" p: 47–50 8/97.
Rubber & Plastics News II Jan. 8, 1996 p. 3.
ISSN: 0197–2219 Ciba–Geigy Purchase Adds to Line, it's two Product lines are acquired by Ciba–Geigy.

Society of Manufacturing Engineers, (1991) Technical paper, by Lewis Bogart.

Society of Manufacturing Engineers, (1993) Technical paper, by Scott A. Martyniak.

* cited by examiner

PROCESS FOR PRODUCING DIRECT TOOLING MOLD AND METHOD FOR USING THE SAME

FIELD OF THE INVENTION

The present invention relates to a method for producing functional prototypes using polymeric molds. The polymeric molds are relatively low-cost, dimensionally accurate and rapidly formed. The instant invention has particular utility in the product design and premanufacturing phase in industries, such as automobiles, toys, consumer electronics, and biomedical devices, where rapid prototyping is vital to success.

BACKGROUND

Prototypes are three dimensional representations of the whole or a component of an article to be manufactured. The prototype may be built to actual size or scaled down. The advantage of prototypes relative to blue prints or even three dimensional renditions on a computer screen is the ability to hold, turn, and feel the actual part. As the complexity of part manufacturing increases, the need to visually inspect an article during its design phase has increased. Given the significant advantages of utilizing a prototype during the initial design phase, it is not surprising that the areas in which prototypes are considered essential continue to grow.

A well-known means for producing a prototype part utilizes laminated polyurethane or epoxy-based modeling boards. The laminated boards have the look, feel and consistency of wood. Prototype models are produced by cutting and shaving away excess board material. The boards are capable of showing exterior surface features and details. Such systems are particularly useful for inspecting relatively large articles. Preparing prototypes from a laminated board requires a great deal of time and experience.

An alternative technology for producing highly accurate and detailed prototypes is stereolithography. A three-dimensional object is produced in a stereolithographic system that contains a resin bath, an irradiating source and a movable support. The movable support is capable of moving vertically within the resin bath. The resin bath contains selected high performance resins that are curable when subjected to ultraviolet radiation. The irradiating source directs its energy at the surface of the resin bath to selectively cure regions of the top layer of resin.

The irradiating source is controlled by a computer. The computer determines the movement and direction of the irradiating source based upon an analysis of a computer-aided design of the desired object. The computer essentially determines the outline of the desired object on a layer by layer basis. The computer then directs the irradiating source to selectively cure regions of the top layer to conform with the outline of each layer. As each layer is completed, the movable support lowers the previously cured layer into the resin bath to allow new resin to overflow the previously cured layer. This process is repeated until the desired object is produced. A thermal postcuring step is usually required to give the resulting cured article sufficient strength.

A similar additive build process is fused deposition modeling, which uses thermoplastic wire-like filaments. The filaments are melted and extruded through a delivery head on a layer-by-layer basis. The extrudate is positioned by the delivery head which follows a computer-aided design layer outline. As the layers are deposited, a platform is lowered that supports the layered extrudate.

A further additive build process is three dimensional printing. Three dimensional printing uses powdered materials, such as refractory powder and a binder material. Three dimensional parts are fabricated by selectively applying binder to a thin layer of refractory powder, which causes the powder to stick together. The layers are formed sequentially in a manner analogous to the previously discussed additive build processes.

Ballistic particle manufacturing produces three dimensional objects using an ink-jet mechanism to deposit a wax-like material on a layer-by-layer basis. A related process utilizes an ink-jet mechanism to deposit molten metal on a layer basis.

Laminated object manufacturing produces three-dimensional objects by laminating layers of trimmed sheet material. The laminated sheets of material are trimmed using a laser. Successive layers of sheet material adhere to one another using heat and pressure to activate a thermal adhesive.

The building processes described above can be utilized to produce the actual prototypes, not molds themselves. For this reason, the building processes described above all suffer from the same shortcoming that only one prototype results from each building cycle.

Lost core molds have been used to produce molds for the actual parts. For example, the automobile industry increasingly uses aluminum engine components to reduce weight and energy consumption in its vehicles while controlling manufacturing costs. But the mechanics of making and assembling cores and molds for conventional casting has limited the designs that could be cast. The process of lost foam casting, in which a Styrofoam pattern immersed in dry sand becomes a metal casting as hot metal vaporizes the plastic foam, allows automotive companies to cast cylinder heads with the complex geometries required for modern internal combustion engines. The cost of producing the tools to create the foam patterns, however, is high and changes in tooling take substantial amounts of time.

Additionally, at least one company proposes to develop a low-cost tool-making machine and associated processes to produce plastic, ceramic, and metal tools for use in automobile manufacturing. The proposed Motor Vehicle Rapid Tool Maker (MVRTM) would use a precision plotter to position a jet to deposit small drops of a "build" material consisting of a thermoplastic material or a slurry of ceramics or powdered metal. Another jet would deposit a wax that would serve as the "support" material for part bracing and fine definition. Then the model would be trimmed to the desired height and dipped into a solvent to melt the wax. The resulting pattern of "build" material would be converted to a metal tool through an investment casting or sintering process.

U.S. Pat. No. 5,641,448, assigned to the National Research Council of Canada, discloses a process for making a prototype mold using a stereolithography system. A solid support is provided on the prototype mold to prevent flexing. Additionally, the inner surface of the mold is coated with a thin metal coating. The mold is fitted into an injection molding machine to produce prototype parts at relatively low pressures. U.S. Pat. No. 5,439,622, assigned to Motorola, Inc., also discloses a process for making a prototype mold using a stereolithography system. U.S. Pat. No. 5,458,825, assigned to Hoover Universal, Inc., discloses a process for making blow molding tooling manufactured by stereolithography for rapid container prototyping. U.S. Pat. No. 5,562,846, assigned to Northern Telecom Limited, discloses a process for manufacturing a mold part having a cooling passage in a stereolithography system.

U.S. Pat. No. 4,863,663, assigned to General Motors Corporation, discloses a process for making a motor vehicle component part. A rough model is fabricated of the desired component part from a plurality of interlocking, cut rigid sheet materials. The exterior surfaces defined by the interlocking, cut rigid sheets are coated with a sheet material. The resulting model can be used to make a mold for subsequent manufacture of prototype parts. The mold is constructed by successively layering the resulting model with resin and glass fiber cloth.

U.S. Pat. No. 5,231,749, assigned to John H. Hutchinson, relates to a method of making an interior and exterior design verification model. The material used for making the design model can include clay, REN, wood, composite modeling compounds, high density foam and fiberglass.

U.S. Pat. No. 5,432,322, assigned to Bruder Healthcare Co., relates to an improved heating pad and method for making the same. In one embodiment of said method, a heat element is covered by a continuous layer of outer organic polymer by molding the polymer over the element. A mold is fabricated used REN-Shape™ material, a composite tooling material. After the mold is fabricated, the heating element and associated components are placed in the mold, which is clamped shut. A casting polyurethane composition is then pumped into the mold to encapsulate the unit. The mold is unclamped after cure to remove the overmolded sealed heating pad.

Despite the on-going research endeavors, there exists a need for a system capable of producing multiple, dimensionally accurate and functional prototypes. The system must be flexible to allow multiple design changes without significant time delays. Additionally, the system preferably should produce a prototype using the same material that will be used to produce the final article.

SUMMARY OF THE INVENTION

The present invention relates to a method for manufacturing a mold by providing at least one polymeric board material having a glass transition temperature less than the molten temperature of a thermoplastic molding material and removing at least a portion of the polymeric board material to form, according to a computer-aided design, a reverse image of a desired article to be molded. Preferably, at least a portion of the polymeric board material is removed using a high speed CNC machining device. The polymeric board material can be a cured polyurethane-forming composition or a cured mixture containing at least one epoxy resin having, on average, more than one glycidyl group per molecule. The thermoplastic molding material is preferably selected from the group of polypropylene, acrylonitrile-butadiene-styrene copolymer and polycarbonate.

An additional embodiment of the present invention is a method for manufacturing a mold by providing at least one polymeric board material and removing, according to a computer-aided design, by CNC machining at least a portion of the polymeric board material to form a reverse image of a desired article to be molded. Preferably, the polymeric material has a glass transition temperature then less the molten temperature of a thermoplastic molding material to be injected into said mold. The polymeric board material can be a cured polyurethane-forming composition or a cured mixture containing at least one epoxy resin having, on average, more than one glycidyl group per molecule. The thermoplastic molding material is preferably selected from the group of polypropylene, acrylonitrile-butadiene-styrene copolymer and polycarbonate.

A further embodiment of the present invention is a method for manufacturing a prototype by providing a mold prepared from a cured polymeric material having a glass transition temperature less than the molten temperature of a selected polymeric molding material and injecting said selected molten polymeric molding material into a cavity formed according to a computer-aided design within the mold to produce the prototype. The present invention further relates to a prototype resulting from this method.

A still further embodiment of the present invention is a method for manufacturing a prototype by providing a mold prepared from a cured polymeric material and injecting a selected molten molding material into a cavity formed by CNC machining, according to a computer-aided design, within the mold to produce the prototype. The present invention further relates to a prototype resulting from this method.

A still further embodiment of the present invention is a method for manufacturing a functional prototype of a final article made from a selected polymeric material by providing a mold prepared from a cured polymeric material having a glass transition temperature less than the molten temperature of a selected polymeric molding material and injecting said selected molten polymeric molding material that is substantially identical to the selected polymeric material for the final article into a cavity formed according to a computer-aided design within the mold. The present invention further relates to a functional prototype resulting from this method.

A still further embodiment of the present invention is a method for manufacturing a functional prototype of a final article made from a selected polymeric material by providing a mold prepared from a cured polymeric material and injecting a selected molten polymeric molding material that is substantially identical to the selected polymeric material for the final article into a cavity formed by CNC machining, according to a computer-aided design, within the mold to produce the prototype. The present invention further relates to a prototype resulting from this method.

The present invention further relates to a polymeric mold for manufacturing prototypes and functional prototypes prepared from a cured polymeric material comprising at least one epoxy resin having, on average, more than one glycidyl group per molecule, an epoxy-isocyanate composition or a polyurethane-forming composition.

DETAILED DESCRIPTION OF THE INVENTION

Figure 1B:
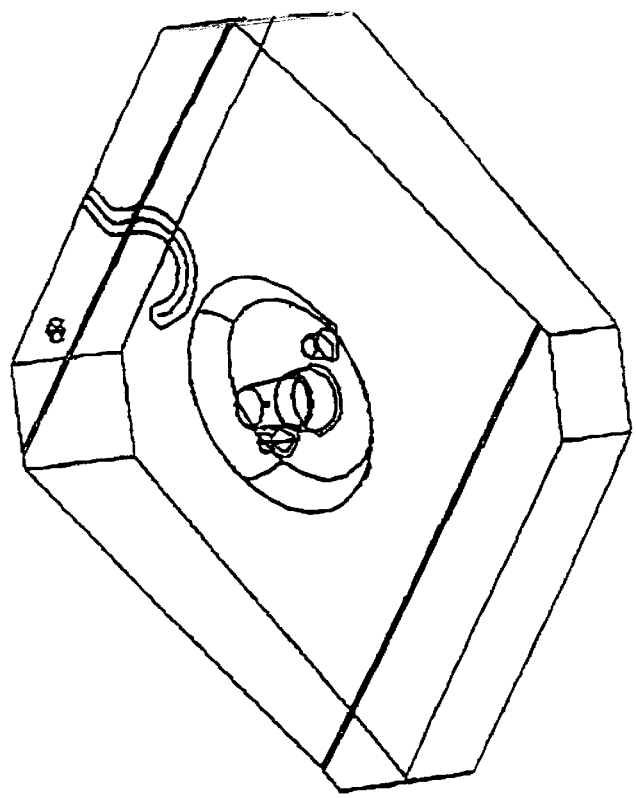
FIG. 1(b) is a perspective drawing showing a cover (cavity) insert from a CAD model.

The present invention relates to a method for producing multiple, dimensionally accurate and functional prototypes. A particularly preferred method for making the prototypes involves the use of polymeric molds in an injection molding system. Although the primary focus of the following description relates to injection molding, those skilled in the art will recognize that other molding systems, such as blow molding, would be suitable for producing prototypes.

Injection molding is an intermittent, cyclic process in which particles of polymeric material are heated until molten. The molten material is then forced into a closed mold in which it solidifies to form a desired article. The manner in which the molten material solidifies depends on the type of injected material. Thermoplastic materials harden upon cooling while thermosetting materials solidify by the addition of heat. Injection molding systems typically include mixing and melting sections, a means for injecting the molten mass, and a molding section.

Molds within injection molding systems contain a cavity section that is the reverse image of a desired article. The molds commonly are provided in two parts, which are clamped together under pressure. An opening is provided in the mold to introduce the molten mass into the cavities of the mold. A mold design must provide venting to allow for the escape of air as the molten material is introduced into the mold.

The material of choice for mold construction must be capable of withstanding the injection molding operation. Sufficient temperature and pressure must be developed within the tool to ensure the molded product will reflect the resin manufacturer's performance specifications. An approximate plastic pressure applied to the resin during injection and packing will vary from about 1200 psi to about 20,000 psi.

The molds for use herein are designed using a computer-aided design software package that analyzes the configuration of the desired article. The software program thereafter calculates a reverse image of the desired article and allows the incorporation of desired venting, cooling and ejection channels.

Prototypes are molded from a number of different polymeric materials. The present invention contemplates that the selected molding material corresponds to the type of material to be used on the final article. As a result of using the same type of molding material, the user can produce a functional prototype. A functional prototype means that the resulting prototype has substantially the same properties, such as weight, density, feel, flexibility, as the desired final article. A functional prototype can be subjected to a battery of performance tests as well as being visually inspected for accuracy. The ability to subject the resulting prototypes to destructive testing is a significant advantage over systems that produce only one prototype per production cycle. Examples of commonly used polymeric, particularly, thermoplastic materials include polyolefins such as polypropylene, styrenics such as acrylonitrile-butadiene-styrene copolymer (ABS), polycarbonate, acetal etc.

The molds used within this system are made from a polymeric modeling material. The modeling material should have low water absorption, low dust generation, low chipping, low cutter wear, good machinability and low density. It is especially important that the modeling material is capable of being machined to produce desired molded surface effects and interior detailing. The modeling material must have sufficient compressive and flexural strength to withstand the machining and molding operations. Preferably, the modeling material has a compression strength and a flexural strength in excess of about 8,000 psi. Additionally, the modeling material must be able to withstand the temperatures of the molten material injected during the molding operations. Surprisingly, it was discovered that the glass transition temperature of the modeling material can be below the melt temperature of the molding materials being injected into the molding system.

Preferred modeling materials are cured polymeric boards. The boards are generally provided in rectangular form having a thickness of at least about 4 inches, a width of about 18 to 24 inches, and a length of about 24 to 36 inches.

The preferred boards result from a mixture of thermosetting resin systems. The thermosetting resin systems contain selected matrix components, hardeners, catalysts, fillers and other customary additives. The matrix components preferably are selected from polyurethane-forming compositions, epoxy resins, and so-called epoxy-isocyanate resins (EPIC, available from Bayer, Germany). Polyurethane-based modeling boards can be used for molding polypropylene- and ABS-based prototypes. Epoxy-based modeling boards are most suitable for molding polypropylene prototypes, ABS-based prototypes and polycarbonate-based prototypes.

Curable polyurethane-forming compositions are prepared from a mixture of at least one polymeric isocyanate and at least one polyol. The preferred polyurethane-based boards are prepared from a reaction mixture that include a selected mixture of polyols which comprises a) a polyol having a hydroxyl equivalent weight of up to about 150 and a functionality of 4 to 8, b) a polyether-polyol having a hydroxyl equivalent weight of more than 1900 and a functionality of 2 to 4, and c) a propylene glycol having a functionality of 2 to 4 or a polytetrahydrofuran, each of which has a hydroxyl equivalent weight of 150 to 500, or a mixture thereof.

Examples of the polyol components having a hydroxyl equivalent weight of up to about 150 are polyhydroxyl compounds having 4 to 8 hydroxyl groups, such as erythitol or pentaerythitol, pentitols, such as arabitol, adonitol or xylitol, hexitols, such as sorbitols, mannitol or dulcitol, sugars, such as sucrose or sugar derivatives and starch derivatives. Further examples are low molecular weight reaction products of polyhydroxy compounds, such as those mentioned with ethylene oxide and/or propylene oxide, and also the low molecular weight reaction products of other compounds which contain a sufficient number of groups that are capable of reacting with ethylene oxide and/or propylene oxide, such as polyamines, including ammonia, ethylenediamine, 1,4-diaminobenzene, 2,4-diaminotoluene, 2,4'-diaminodiphenylmethane, 4,4'-diaminodiphenylmethane, 1-methyl-3,5-diethyl-2,4-diaminobenzene and/or 1-methyl-3,5-diethyl-2,6-diaminobenzene. The lower limit for the hydroxyl equivalent weight of the polyols is preferably about 60, more preferably the hydroxyl equivalent weight is greater than about 70.

Sucrose or starch derived polyols are particularly preferred. Such products are commercially available from Olin Corp.

The polyol components can comprise about 5% to about 30% by weight of the polyol having a hydroxyl equivalent of up to about 150 and a functionality of 4 to 8.

The polyether polyols can be obtained by reaction of an initiator with alkylene oxides, for example, ethylene oxide, propylene oxide or butylene oxide, or tetrahydrofuran. Initiators here are all the initiators which are usually suitable for the preparation of polyether polyols, having a functionality of 2 to 4, such as water, aliphatic, cycloaliphatic or aromatic polyhydroxyl compounds having 2 to 4 hydroxyl groups, such as ethylene glycol, propylene glycol, butanediols, hexanediols, octanediols, dihydroxybenzenes or bisphenols, glycerol, erythritol, or pentaerythritol, or corresponding polyamines, such as ethylenediamine or dianilines. Polyether-polyols based on ethylene oxide and/or propylene oxide are preferred. The hydroxyl equivalent weight of the polyether-polyols should be greater than about 1900. The upper limits for the equivalent weight is preferably about 3000. The amount of polyether-polyol is preferably about 3 to about 40%, more preferably 5% to 30% by weight of the total polyol component.

Polyisocyanates that are liquid at ambient temperatures or at only slightly elevated temperatures are generally preferred. Suitable polyisocyanates include monomeric diisocyanatodiphenylmethane isomers, polymethylene polyphenyl isocyanate, 4,4'-isophenylmethane diisocyanate and modifications thereof, toluene diisocyanate, phenylindane diisocyanate, hexamethylene diisocyanate, isophorone diisocyanate, 2,2,4-trimethylenehexamethylene diisocyanate, and blends thereof. The curable polyurethane-forming compositions can further include customary additives, such as catalysts, such as tertiary amines, foam suppressants, surface active agents, internal mold release agents, dyes, pigments, and flameproofing agents and molecular sieves. The curable polyurethane-forming compositions further include non-conductive fillers, such as aluminum trihydrate and calcium carbonate.

The preferred board materials for molding of functional prototypes of high HDT thermoplastics such as polycarbonate are based on epoxy resins or epoxy-isocyanate resins. Suitable epoxy resins have a low viscosity at room temperature and, on average, more than one glycidyl group per molecule. Mixtures of low viscosity bisphenol-A resins, non-advanced polyglycidyl ethers of 2,2-bis(4'-hydroxyphenyl) propane (bisphenol A), 2,2'-bis(3'-5'-dibromo-4'-hydroxyphenyl)methane (tetrabromobisphenol A), bis(4-hydroxyphenyl)methane (bisphenol F), and advanced novolaks thereof are particularly preferred. Customary additives as described above can be incorporated into the curable epoxy composition. The resin mixture must have sufficiently low viscosity to allow the incorporation of fillers, particularly non-conductive fillers, such as aluminum trihydrate and calcium carbonate.

The epoxy resins can be cured using either basic or acidic curing agents. The hardener should have low reactivity and produce a low exothermic curing reaction that can be initiated at room temperature. Examples of basic curing agents are Lewis bases, primary and secondary amines, such as diethanolamine, ethyl- and methylethanolamine, dimethylamine, diethylamine, methylethylamine, and methyl-n-propylamine, piperidine, and piperazines, cycloaliphatic amines, such as isophorone diamine, and aromatic primary amines, such as phenylenediamine, methylenedianiline, and diaminodiphenysulfone, and amides, such as dicyandiamide and acrylamide. The acid curing agents are carboxylic acid anhydrides, dibasic organic acids, phenols, and Lewis acids. The preferred curing agents are mixtures of primary, secondary and tertiary amines (catalyst). Anhydride curing agents, while suitable for certain applications, tend to require at least modest heating to initiate the curing reaction. A sufficient amount of curing agent is added to the composition to fully cure the epoxy resin component.

The polyurethane-based boards are produced by combining an isocyanate premix with a polyol component. The resulting mixture is injected into a block mold to cure. Preferably, no heat is added during the curing stage. The resulting cured block is then subjected to a post-cure annealing. The epoxy-based modeling boards are prepared analogously in that a resin component and a hardener component are mixed and then injected into a block mold to cure. The temperature of the cure cycle depends upon the selected hardener. Preferably, no heat is added and only modest heat is generated due to the curing reaction. The resulting cured epoxy-based block is also subjected to post-cure annealing.

Polymeric molds for use in the present invention are preferably formed using a high speed CNC machining device. The high speed machining, though not a must, is preferred step that provides a tremendous time-compression in the prototyping process. The CNC machining device employs a computer that controls a cutting device. The cutting device shaves, cuts, routs, drills, and removes material from the cured polymeric board. The cutting device removes material from the cured polymeric board to produce the reverse image of a desired final article therein based upon a CAD design described above. A preferred CNC machining device should be rigid and repeatable to provide consistent results with appropriate surface finish and dimensional requirements. The preferred machining device is capable of "roughing" out material from the cured polymeric board at greater than 200 inches per minute.

To enhance the performance of the resulting polymeric mold, a metallic support can be attached to the back surface of the mold. The metallic support allows the polymeric mold to withstand the force and stress of injection molding for longer periods of time and for greater cycles. A suitable frame or support is required to provide attachment and mounting of the modeling compound into the desired molding press. This frame also provides for the mounting of functional details (i.e.; ejection) which allows for automatic or semi-automatic production.

The temperature and pressure of the injection molding system depends on the type of material to be molded. The selected material to be molded must be heated to a sufficient temperature in order to produce a consistent molten mass. The temperatures required to melt conventional molding materials ranges from about 350° F. to about 600° F. Additionally, the molten mass must be subjected to sufficient pressure to force the molten mass into the mold. Typically, the pressure within an injection molding system approaches 20,000 psi (plastic pressure).

Cover and ejector machining begins with the squaring of the inserts and mounting the inserts to a holding device. The holding device allows for the quick, repetitive installation within a high speed machining center. Bridgeport squaring and preparation is accomplished with solid carbide end mills and HSS drilling, tapping and reaming. Spindle speeds vary based upon tool type and condition. Feed rates can be up to 100 inches/minute. Vacuum type dust collection is recommended and available through the use of a portable system.

High speed CNC machining setup parameters as defined in cutter pathing allow for the tool setup as required by product geometry. Preferred tooling is solid carbide ball nosed end mill with 1½° taper per side for draft. Spindle speed is generally 6000 to 10,000 revolutions per minute for roughing and 15,000 for finishing. Table feed rates for roughing are 240 inches per minute, with ¾ ball at 5/32 depth of cut. Finishing feed rates are dependent on the machining language architecture's ability to interpret surface data. Cutter wear is negligible while providing excellent surface characteristics using 0.006 inch stepovers with 3D drive curve machine path programming utilizing 3/32 diameter cutters for parts shown in FIGS. 1(a) and 1(b).

The preferred CNC machining center has a sealed cabinet design with a down draft vacuum system to minimize operator exposure and clean-up.

Inserts are sized during the CNC operation to allow easy installation into a pocketed frame. Generally, inserts are 0.001 to 0.002 inches smaller than the pocket size. Tool compression or preload is also determined during this operation allowing 0.001 to 0.002 inches total at parting line. Parting lines are not relieved. Vents, however, can be added as needed.

Gating should follow the resin manufacturers guidelines based upon targeted part resin, Mold flow techniques help establish appropriate gating locations.

The machined inserts are removed from the machining center, cleaned and deburred. Secondary benching is not required providing adequate care has been taken during programming and machining operation.

It should be noted that the surface can be polished to a smooth, totally cutter-free finish, if desired. Texturing is possible and mold sealing is advised.

Completed inserts are secured to the supporting frame and fitted with appropriately sized ejector pins. The completed mold tool is now ready for the molding operation. Molding press set-up and molding techniques are key to parting line integrity. Clamp forces should be minimized to avoid excess compression of the tool. Injection pressures and temperatures are interactive within the molding operation, care must be taken to minimize internal part stress during molding. Pressures and temperatures must be sufficient to provide acceptable product performance while following the resin manufacturer's guidelines. Part ejection should take place below the targeted resins heat deflection temperature.

The cooling is accomplished by directing air over the surface of the mold. Cycle time is dictated by the melt temperatures of the selected resin and the amount of mold open time need to reduce the tool surface temperature to an acceptable level.

Preheating of the tool is not necessary. However, tool life and integrity are sacrificed if tools are operated above 150° F. on tooled surfaces.

Pick-ups can be added to aid in part retention on the ejector side. Care should be taken to locate them far enough away from the parting line to prevent chip-out (fewer shallower pick-ups are preferred).

EXAMPLES

| 1. Preparation of Epoxy Board Material C1 | |
|---|---|
| Following epoxy resin A1 was formulated | |
| Resin A1 | pbw |
| Low-viscosity bis-A resin[1] | 65 |
| Multifunctional epoxy resin (epoxy novolac)[2] | 25 |
| Reactive diluent[3] | 10 |
| Following hardener B1 was formulated | |
| Hardener B1 | |
| Cycloaliphatic diamine IPDA[4] | 28 |
| Adduct of Ethacure 100 + epoxy novolac EPN 1138[5] | 60 |
| MXDA[6] | 6 |
| Aliphatic polyamine, DETA[7] | 4 |
| Bisphenol-A[8] | 2 |
| Formulation C1 was prepared as follows: | |
| Resin A1 | 1950 g |
| Hardener B1 | 625 g |
| ATH Filler[9] | 3800 g |
| Defoamer Anti foam A[10] | 3.2 g |

[1]Low viscosity bis-A resin is available from Ciba Specialty Chemicals Corp, USA as GY 6004 with epoxy equivalent weight (EEW) of 178–196 g/eq.
[2]Multifunctional epoxy novolac resin is available from Ciba Specialty Chemicals Corp, USA as EPN 1138 with EEW of 176–181 g/eq and of functionality 3.6.
[3]Reactive diluent is available from Ciba Specialty Chemicals Corp, USA as RD-2 (1 ,4 butanediol diglycidyl ether).
[4]Isophorone diamine is available from Huls America as IPD.
[5]Ethacure 100 is available from Albemarle Corp.,USA. The adduct of Ethacure 100 and EPN 1138 is prepared by reacting the two in the ratio of 85 wt % Ethacure 100 and 15 wt % EPN 1138.
[6]MXDA metaxylene diamine is available from Mitsubishi Chemicals, USA as MXDA.
[7]Diethylene triamine DETA is available from Union Carbide Corp., USA.
[8]Bisphenol-A is available from Ciba Specialty Chemicals Corp. USA as Parabis.
[9]Aluminum trihydrate ATH filler is available from Ciba Specialty Chemicals Corp., USA as DT O82.
[10]Antifoam A is available from Dow-Corning Corp., USA.

First the resin and hardener were mixed using a hand mixer in a container. Anit-foam A was added and mixed well. Then filler was added with gradual mixing. The mixture was deaerated and then cast in to 7"×7"×5" non-conductive mold. The mold was placed in a pressure vessel at 80 psi for 24 hrs at room temperature of 25° C. Then it was further cured at room temperature for additional 24 hrs. The block was demolded and gradually heated to 150° C. in 8 hrs and post cured at 150° C. for 4 hrs and gradually cooled down. The resulting board material was tested for thermal and mechanical properties.

Figure 2:
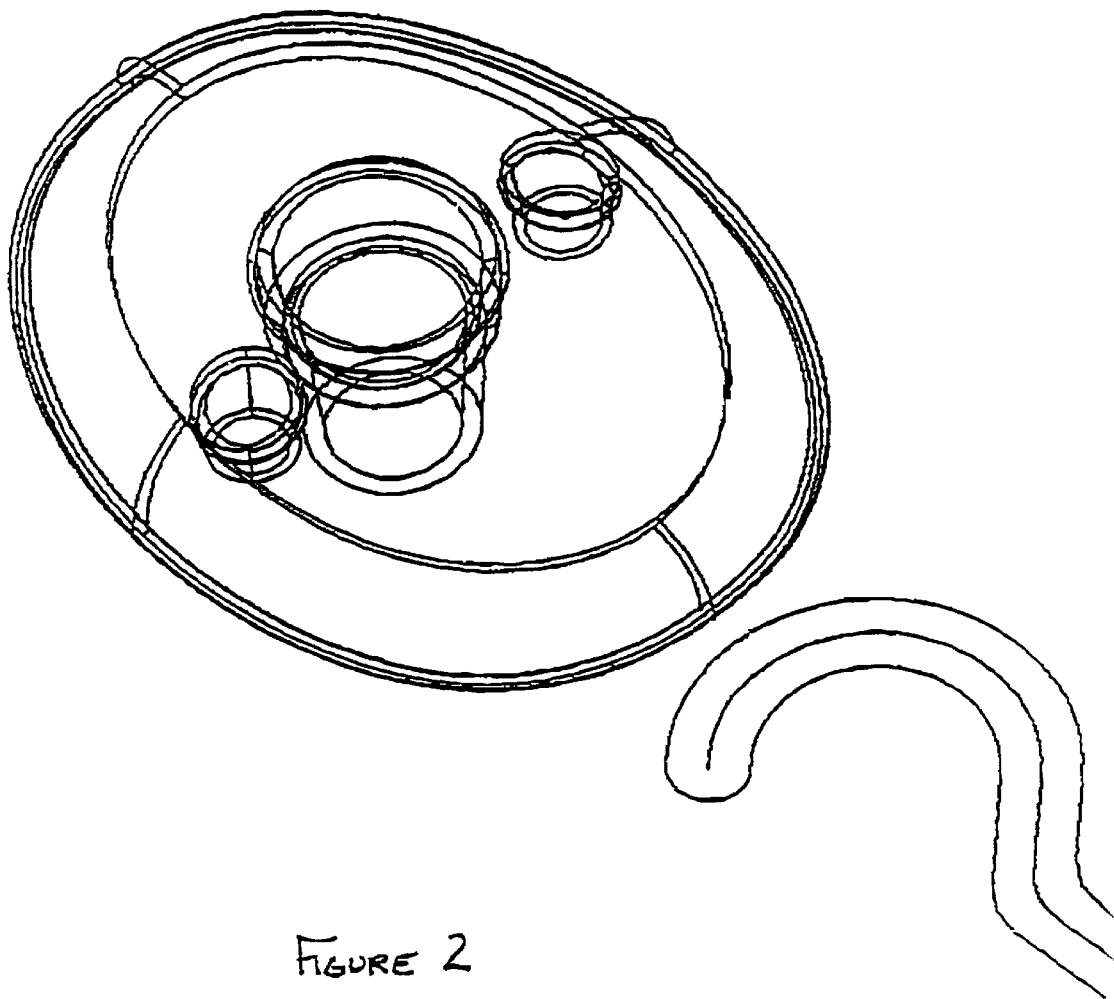
FIG. 2 is a perspective drawing of the molded prototype and runner.

| Examples of Processing Conditions for Parts Shown in FIG. 2 | | | | | | |
|---|---|---|---|---|---|---|
| | Melt Temp., ° F. | Fill, psi* | Pack, psi* | Fill Time, sec. | Cycle Time, sec | Tool Temp-# Start, ° F. | Tool Temp-# Eject, ° F. |
| Polypropylene | 380/430 | 6000 | 1200 | 0.8/1.2 | 70 | 100 | 130 |
| ABS | 475/525 | 10,000 | 2000 | 0.8/1.2 | 80 | 100 | 140 |
| Polycarbonate | 550/600 | 20,000 | 5500 | 0.8/1.2 | 90 | 105 | 150 |

*Fill and pack pressure is in plastic pressure approximation.
Approximate Tool temperatures are measured at point nearest the gate on the ejector side.

| Properties of board material C1 | |
|---|---|
| Density | 1.7 g/cm³ |
| Hardness | 95 Shore D |
| DMA E" Tg | 174° C. |
| Tensile Strength | 5654 psi |
| Tensile Modulus | 1100 kpsi |
| Flexural Strength | 9411 psi |
| Flexural Modulus | 1070 kpsi |
| Compression Strength | 17224 psi |
| Compression Modulus | 966 kpsi |
| Izod Impact | 0.33 ft-lb/inch of notch |

| 1. Preparation of Epoxy Board Material C2 Formulation C2 was prepared as follows | |
|---|---|
| Resin A1 | 2780 g |
| Hardener B1 | 880 g |
| Aluminum Filler[11] | 5400 g |
| Defoamer Anti foam A[9] | 4.5 g |

[9]Aluminum Powder filler is available from Ciba Specialty Chemicals Corp., USA as RP 34.

First the resin and hardener were mixed using a hand mixer in a container. Anit-foam A was added and mixed well. Then filler was added with gradual mixing. The mixture was deaerated and then cast in to 7"×7"×5" non-conductive mold. The mold was placed in a pressure vessel at 80 psi for 24 hrs at room temperature of 25° C. Then it was further cured at room temperature for additional 24 hrs. The block was demolded and gradually heated to 150° C. in 8 hrs and post cured at 150° C. for 4 hrs and gradually cooled down. The resulting board material was tested for thermal and mechanical properties.

| Properties of board material C2 | |
|---|---|
| Density | 1.76 g/cm³ |
| Hardness | 94 Shore D |
| DMA E" Tg | 177° C. |
| Tensile Strength | 9173 psi |
| Tensile Modulus | 1080 kpsi |
| Flexural Strength | 15112 psi |
| Flexural Modulus | 970 kpsi |
| Compression Strength | 43940 psi |
| Compression Modulus | 806 kpsi |
| Izod Impact | 0.67 ft-lb/inch of notch |

| 1. Preparation of Polyurethane Board Material C3 Following Isocyanate Resin A3 and Hardener B3 were used to make polyurethane cured board material C3. | |
|---|---|
| Resin A3 | pbw |
| Rubinate 1680[12] | 100 |
| Hardener B3 | pbw |
| Sucrose Based Polyol with EW 151 (n > 3)[13] | 11.88 |
| Sucrose Based Polyol with EW 125 (n > 3)[13] | 7.00 |
| Diol with EW 212[13] | 4.30 |
| Triol with EW 1558[13] | 1.20 |
| Triol with EW 468[13] | 1.20 |
| Triol with EW 2033[13] | 1.80 |
| Antifoam A[10] | 0.02 |
| Wetting agent[14] | 0.20 |
| CaCO₃ filler[15] | 19.0 |

-continued

| 1. Preparation of Polyurethane Board Material C3 Following Isocyanate Resin A3 and Hardener B3 were used to make polyurethane cured board material C3. | |
|---|---|
| ATH filler[9] | 48.0 |
| Accelerator MDEA[16] | 0.40 |
| Molecular Sieves[17] | 5.00 |
| Formulation C3 | pbw |
| Resin A3 | 20 |
| Hardener B3 | 80 |

[12]Rubinate 1680 is available from ICI Americas.
[13]The polyols are available from Olin Corp.
[14]Wetting agent is available from Bykchemie USA
[15]CaCO₃ filler is available from Polar Minerals Inc.
[16]MDEA is available from Union Carbide.
[17]Molecular sieves are available from Zeochem Corp.

Board was cured from formulation C3 metallic molds. The cured board was postcured at 70° C. ° F. for 10 hrs. Properties of the board C3 were as follows.

| Properties of board material C3 | |
|---|---|
| Density | 1.7 g/cm³ |
| Hardness | 90 Shore D |
| DMA E" Tg | 108° C. |
| Tensile Strength | 4600 psi |
| Flexural Strength | 8000 psi |
| Flexural Modulus | 970 kpsi |
| Compression Strength | 9500 psi |

| Preparation of Epoxy Board Material C4 | |
|---|---|
| Following epoxy resin A4 was formulated | |
| Resin A4 | pbw |
| Standard bis-A resin[18] | 61.5 |
| Multifunctional epoxy resin (MY 721)[19] | 38.5 |
| Following hardener B4 was formulated | |
| Hardener B4 | pbw |
| Anhydride curing agent MTHPA[20] | 100 |
| Formulation C4 was prepared as follows | |
| Resin A4 | 250 g |
| Hardener B4 | 260 g |
| Filler (RP 34)[11] | 750 g |
| Catalyst EMI-24[21] | 0.13 g |

[18]Standard bis-A resin is available from Ciba Specialty Chemicals Corp, USA as GY 6010 with epoxy equivalent weight (EEW) of 182–192 g/eq.
[19]Multifunctional epoxy resins are available from Ciba Specialty Chemicals Corp, USA. MY 721 is a tetra functional epoxy with EEW of 109–115 g/eq.
[20]Anhydride curing agents are available from Lonza Inc., USA
[21]EMI-24 and similar imidazole catalysts are available from Air Products, USA.

First the resin and hardener were mixed. Then filler was added with gradual mixing. Catalyst was added and mixed well. The mixture was deaerated and then cast in to 8"×3"×2" conductive mold. Then it was cured at 60° C. for 24 hrs. Then was gradually heated to 121° C. and cured for 4 hrs. Then was gradually heated to 150° C. and cured for 4 hrs and gradually cooled down. The resulting board material had excellent thermal and mechanical properties.

| Properties of board material C4 | |
| --- | --- |
| Density | 1.8 g/cm$^3$ |
| Hardness | 90 Shore D |
| DMA E" Tg | 187° C. |
| Tensile Strength | 66578 psi |
| Tensile Modulus | 1410 kpsi |
| Flexural Strength | 9610 psi |
| Flexural Modulus | 1397 kpsi |
| Compression Strength | 30336 psi |
| Compression Modulus | 1157 kpsi |
| Izod Impact | 0.37 ft-lb/inch of notch |
| Preparation of Epoxy Board Material C5 | |
| Following epoxy resin A4 was formulated | |
| Resin A4 | pbw |
| Standard bis-A resin[18] | 61.5 |
| Multifunctional epoxy resin (MY 721)[19] | 38.5 |
| Following hardener B5 was formulated | |
| Hardener B5 | pbw |
| Anhydride curing agent NMA[22] | 100 |
| [22]NMA anhydride curing agent is available from Ciba Specialty Chemicals Corp, USA as HY 906. | |
| Formulation C5 was prepared as follows | |
| Resin A4 | 5147 g |
| Hardener B5 | 6438 g |
| Filler (RP 34)[11] | 17000 g |
| Catalyst EMUI-24[21] | 2 g |

First the resin and hardener were mixed. Then filler was added with gradual mixing. Catalyst was added and mixed well. The mixture was deaerated and then cast in to 12"×12"×5" conductive mold. Then it was cured at 60° C. for 48 hrs. Then was gradually heated to 218° C. and post cured at 218° C. for 12 hrs and gradually cooled down. The resulting board material had excellent thermal, mechanical, and machining properties. The machined board was tested and found satisfactory for making injection molds.

1. Preparation of Epoxy/Polyurethane Mold(s)

Figure 1A:
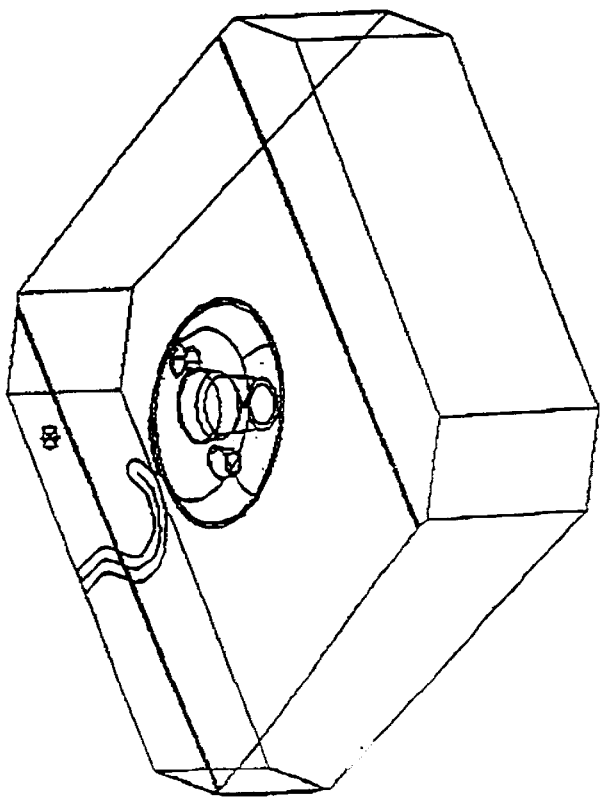
FIG. 1(a) is a perspective drawing showing a core (ejector) insert from a CAD model.

The board material C1 and C2 were machine cut in to 7"×7"×2" pieces and machined to the shapes shown in FIGS. 1(a) and 1(b), which are perspective drawings as shown in a CAD model. The core (FIG. 1(a)) and cavity (FIG. 1(b)) were then sealed and assembled into a suitable frame and products molded.

2. Use of Epoxy Board(s) to Produce Polypropylene, ABS and/or Polycarbonate Prototype Tools prepared from epoxy compounds described as C1, C2 and C5 reflecting the product described in FIG. 2 were molded using General Electric Lexane® 141 Clear to a quantity of not less than 250 pieces within the following settings:

| | |
| --- | --- |
| Melt Temperature | 550° to 588° F. |
| Injection Pressure | 21,150 to 21,956 psi (plastic) |
| Mold Surface Temperature (at ejection) | 138° to 153° F. |
| Mold Surface Temperature (at tool close) | 97° to 118° F. |
| Cycle Time | 89 to 96 seconds |

A tool prepared from epoxy compounds described as C1 and reflecting the product described in FIG. 2 were molded with General Electric Cycolac® (ABS) GDT 6400 to a quantity of not less than 30 pieces with the following settings:

| | |
| --- | --- |
| Melt Temperature | 503° F. |
| Injection Pressure | 11,231 psi (plastic) |
| Mold Surface Temperature (at ejection) | 156° F. |
| Mold Surface Temperature (at tool close) | 144° F. |
| Cycle Time | 59 seconds |

A tool prepared from epoxy compounds described as C1 and reflecting the product described in FIG. 2 were molded in Schulman polypropylene 2268 to a quantity not less than 30 pieces with the following settings:

| | |
| --- | --- |
| Melt Temperature | 400° F. |
| Injection Pressure | 4444 psi (plastic) |
| Mold Surface Temperature (at ejection) | 139° F. |
| Mold Surface Temperature (at tool close) | 107° F. |
| Cycle Time | 69 seconds |

3. Use of Polyurethane Board(s) to Produce Polypropylene and/or ABS Prototype Tools prepared form polyurethane compounds described as C3 and reflecting the product described in FIG. 2 were molded using General Electric Cycolac® (ABS) GDT 6400 to a quantity of not less than 30 pieces with the following settings:

| | |
| --- | --- |
| Melt Temperature | 470 to 503° F. |
| Injection Pressure | 9,500 to 11,066 psi (plastic) |
| Mold Surface Temperature (at ejection) | 130 to 152° F. |
| Mold Surface Temperature (at tool close) | 112 to 140° F. |
| Cycle Time | 60 to 85 seconds |

Tools prepared from polyurethane compounds described as C3 and reflecting the product described in Figure were molded in Schulman polypropylene-2268 to a quantity of not less than 30 pieces with the following settings:

| | |
| --- | --- |
| Melt Temperature | 376 to 390° F. |
| Injection Pressure | 5900 to 6400 psi (plastic) |
| Mold Surface Temperature (at ejection) | 142 to 146° F. |
| Mold Surface Temperature (at tool close) | 112 to 132° F. |
| Cycle Time | 55 to 67 seconds |

Having described the invention in detail and with reference to particular embodiments thereof, those skilled in the art will appreciate that numerous modifications and variations are possible without departing from the spirit and scope of the invention as defined by the appended claims.

What is claimed is:

1. A method for manufacturing a prototype, comprising the steps of:
   (a) providing a cured polymeric material;
   (b) forming a mold having a cavity from the cured polymeric material by computer-aided design; and
   (c) injecting a molten polymeric molding material into the cavity to produce the prototype.

2. A method according to claim 1, wherein the forming step is carried out by CNC machining.

3. A method according to claim 2, wherein the cured polymeric material is based on (i) a polyurethane-forming composition or (ii) a composition comprising an epoxy resin having, on average, more than one glycidyl group per molecule and a curing agent for the epoxy resin.

4. A method according to claim 3, wherein the cured polymeric material is based on a polyurethane-forming composition comprising:

a polyisocyanate component comprising monomeric diisocyanatodiphenylmethane isomers, polymethylene polyphenyl isocyanate, 4,4'-isophenylmethane diisocyanate, toluene diisocyanate, phenylindane diisocyanate, hexamethylene diisocyanate, isophorone diisocyanate, or 2,2,4-trimethylenehexamethylene diisocyanate; and a polyol component comprising a) a polyol having a hydroxyl equivalent weight of up to about 150 and a functionality of 4 to 8, b) a polyether-polyol having a hydroxyl equivalent weight of more than 1900 and a functionality of 2 to 4, or c) a propylene glycol having a functionality of 2 to 4 or a polytetrahydrofuran, each having a hydroxyl equivalent weight of 150 to 500.

5. A method according to claim 3, wherein the cured polymeric material comprises:

cured mixtures of low viscosity bisphenol-A resins;

non-advanced polyglycidyl ethers of 2,2-bis(4'-hydroxyphenyl) propane (bisphenol A);

2,2'-bis(3'-5'-dibromo-4'-hydroxyphenyl)methane (tetrabromobisphenol A);

bis(4-hydroxyphenyl)methane (bisphenol F); or advanced novolaks thereof.

6. A method according to claim 3, wherein the cured polymeric material is an epoxy-isocyanate resin.

7. A method according to claim 2, wherein the polymeric molding material is a thermoplastic.

8. A method according to claim 7, wherein the thermoplastic is polypropylene, acrylonitrile-butadiene-styrene copolymer, or polycarbonate.

9. A method according to claim 2, wherein the cured polymeric material is in the form of a block.

10. A method according to claim 2, wherein during the injecting step the polymeric molding material is subjected to a pressure of at least about 1200 psi plastic pressure.

11. A method according to claim 2, wherein during the injecting step the polymeric molding material is heated to a temperature between about 350° F. to about 600° F.

12. A method according to claim 2, wherein the polymeric molding material is substantially identical to a selected polymeric material of which a final article is made.

13. A method for manufacturing a mold, comprising the steps of:

(a) providing a cured polymeric material; and (b) forming a mold having a cavity from the cured polymeric material by computer-aided design.

14. A method according to claim 13, wherein the forming step is carried out by CNC machining.

* * * * *